(12) United States Patent
Shimada

(10) Patent No.: US 6,717,636 B2
(45) Date of Patent: Apr. 6, 2004

(54) IMAGE DISPLAY DEVICE

(75) Inventor: Naoto Shimada, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/297,289
(22) PCT Filed: Mar. 5, 2002
(86) PCT No.: PCT/JP02/02010
§ 371 (c)(1), (2), (4) Date: Dec. 4, 2002
(87) PCT Pub. No.: WO02/073290
PCT Pub. Date: Sep. 19, 2002

(65) Prior Publication Data
US 2003/0133060 A1 Jul. 17, 2003

(30) Foreign Application Priority Data
Mar. 13, 2001 (JP) .......................................... 2001-69647

(51) Int. Cl.[7] ............................................. G02F 1/1347
(52) U.S. Cl. ............................. 349/77; 349/113; 349/7
(58) Field of Search ............................. 349/7, 113, 77

(56) References Cited

U.S. PATENT DOCUMENTS

| | | | | |
|---|---|---|---|---|
| 5,369,266 A | * | 11/1994 | Nohda et al. | 250/208.1 |
| 5,392,142 A | * | 2/1995 | Mitsutake et al. | 349/77 |
| 5,416,618 A | * | 5/1995 | Juday | 349/1 |
| 6,128,055 A | * | 10/2000 | Park | 349/77 |
| 6,347,014 B1 | * | 2/2002 | Hayashi et al. | 359/634 |
| 6,498,632 B1 | * | 12/2002 | Butterworth et al. | 349/77 |
| 6,619,801 B2 | * | 9/2003 | Cho et al. | 353/20 |
| 6,628,263 B1 | * | 9/2003 | Konuma et al. | 345/104 |

FOREIGN PATENT DOCUMENTS

| | | |
|---|---|---|
| JP | 06-324320 A | 11/1994 |
| JP | 07-007701 A | 1/1995 |
| JP | 08-190072 A | 7/1996 |
| JP | 09-189809 A | 7/1997 |
| JP | 11-259039 A | 9/1999 |
| JP | 2000-98966 A | 4/2000 |

* cited by examiner

Primary Examiner—James A. Dudek
(74) Attorney, Agent, or Firm—Frishauf, Holtz, Goodman & Chick, P.C.

(57) ABSTRACT

An image display apparatus for displaying an image to a viewer, including: a back light for emitting a light for use in displaying; a polarization beam splitter for separating into two parts the emitted light from the back light and projecting one thereof as a polarized light in a specified direction toward a reflecting type LCD display device; the LCD display device for causing the incident light to be reflected at a reflecting film on the back surface thereof to emit a specified displaying light in a polarized condition; and a pixel shifting unit on which the polarized displaying light from the reflective LCD display device after passing through the polarization beam splitter is caused to be incident so that a high-resolution display can be obtained by performing 2-point or 4-point pixel shift.

9 Claims, 13 Drawing Sheets

42 BLACK MATRIX
41
43 PIXEL APERTURE 41   41a

FIG.16A
FIG.16B
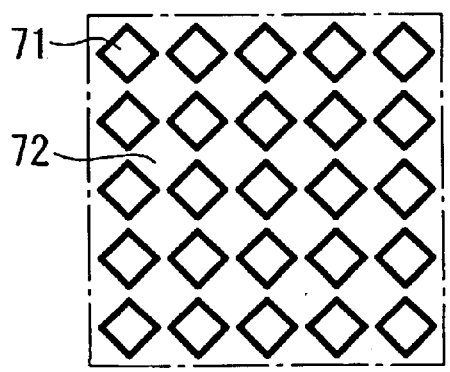
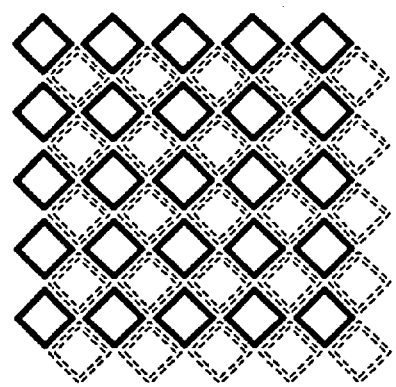
FIG.17A
FIG.17B
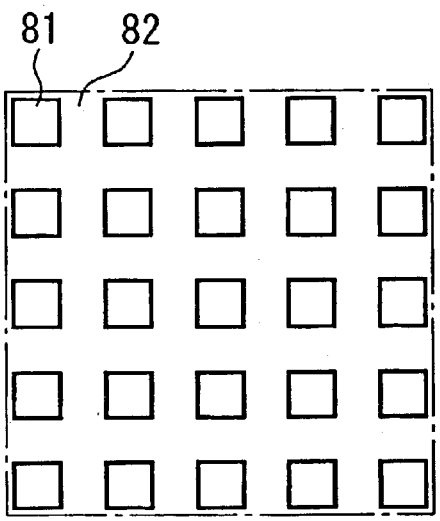
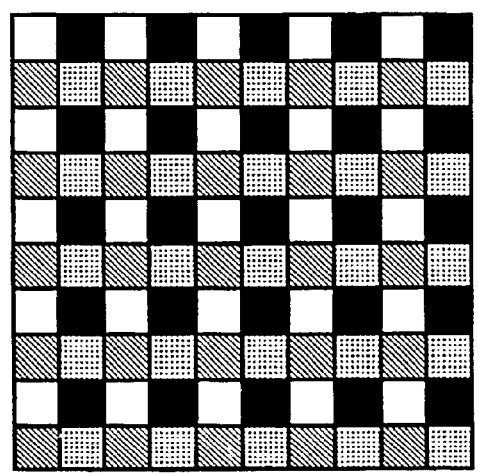

IMAGE DISPLAY DEVICE

This application is a U.S. National Phase Application under 35 USC 371 of International Application PCT/JP02/02010 filed Mar. 5, 2002.

TECHNICAL FIELD

The present invention relates to image display apparatus in which high-resolution images are displayed by using a pixel shifting unit for shifting pixels by means of optical wobbling operation.

BACKGROUND OF THE INVENTION

Among image display apparatus using a liquid crystal display device or the like, an image display apparatus has been disclosed for example in Japanese patent applications laid open No.6-324320 and No.7-7704 in which resolution of the liquid crystal display device is improved by effecting a pixel shifting operation called wobbling where the optical axis of light from the liquid crystal display device is wobbled in predetermined directions.

A description will now be given with respect to the general construction of an image display apparatus in which resolution is improved by such optical wobbling operation. As shown in FIG. 1, a back light 102 for emitting white light is placed on the back side of a color liquid crystal display device 101, and a wobbling device (a pixel shifting unit) 103 for wobbling in predetermined directions the optical axis of light from the color liquid crystal device 101 is placed on the front side of the color liquid crystal display device 101. Here, odd field images and even field images of input video signal are displayed on the color liquid crystal display device 101 at the same pixels thereof through an image display control circuit 104. In accordance with their display timing, the optical axis of light from the color liquid crystal display device 101 is wobbled in predetermined directions by the wobbling device 103.

The wobbling device 103 includes a polarization changing liquid crystal plate 105 and a birefringence plate 106 which is placed on the front side thereof. Here, ON/OFF of voltage across the polarization changing liquid crystal plate 105 is controlled by a wobbling liquid crystal drive circuit 107 based on synchronizing signal of the video signal to be displayed on the color liquid crystal display device 101. The light from the color liquid crystal display device 101 is thereby transmitted without changing its polarization when the voltage is ON, while, when the voltage is OFF, the light from the color liquid crystal display device 101 is transmitted with changing its polarization through 90 degrees, effecting the wobbling operation by changing the location to be emitted from the birefringence plate 106 in accordance with such direction of polarization. It should be noted that, since the color liquid crystal display device 101 retains the image of the preceding field until rewriting of the image of the next field, one of the electrodes of the polarization changing liquid crystal plate 105 is divided into parts each with a plurality of lines such as 5 lines. The other electrode is used as a common electrode and application of voltage is controlled by selecting the one of the electrodes in accordance with the timing of line scan of the color liquid crystal display device 101.

The following operation is performed when alternately displaying odd field images and even field images on the color liquid crystal display device 101. In particular, a case is supposed here as shown in FIG. 2A that the horizontal pixel pitch is Px and the vertical pixel pitch is Py of a pixel group in delta array of the color liquid crystal display device 101. An oblique wobbling operation of 0.75 Px in the horizontal direction and 0.5 Py in the vertical direction, for example, is performed by the above described wobbling device 103 so that the pixel array of the color liquid crystal display device 101 is located at the position as indicated by the broken lines in FIG. 2B when an odd field image is to be displayed, while the pixel array is located at the position indicated by solid lines when an even field is to be displayed. Specifically, if for example Px is 18 $\mu$m and Py is 47.5 $\mu$m, the wobbling operation is effected so as to achieve an oblique distance of about 27.3 $\mu$m, shifted by 13.5 $\mu$m horizontally and 23.75 $\mu$m vertically.

For this reason, a crystallographic axis 106a of the birefringence plate 106 is set as shown in FIG. 3 in a direction inclined with respect to the XY coordinate of on the color liquid crystal display device surface and Z direction which is normal thereto. Here, when the direction of polarization of incidence agrees with the direction of polarization of light from the color liquid crystal display device, the light from the color liquid crystal display device is transmitted as extraordinary rays so as to shift the pixels. When the direction of polarization of incidence is rotated through 90 degrees with respect to the direction of polarization of light from the color liquid crystal display device, it is transmitted intact as ordinary rays without shifting the pixels.

In this manner, as shown in FIG. 4, when the image of an odd field is to be displayed on the color liquid crystal display device 101, voltage application to the region of the polarization changing liquid crystal plate 105 corresponding to the horizontal lines to be rewritten is turned ON, so as to transmit the light from such lines intact without rotating the direction of polarization through 90 degrees. The light is emitted by the birefringence plate 106 as extraordinary rays to shift the pixels. On the other hand, when the image of an even field is to be displayed, voltage application to the region of the polarization changing liquid crystal plate 105 corresponding to the horizontal lines to be rewritten is turned OFF, so as to transmit the light from the lines as rotated in the direction of polarization through 90 degrees, causing the birefringence plate 106 to emit the light intact as ordinary rays without shifting the pixels.

In addition, an image display apparatus is known to be provided with two units of such one-dimensional two-point pixel shifting unit each having a polarization changing liquid crystal plate and birefringence plate so as to achieve a high resolution of two-dimensional four-point pixel shift. These are combined to form a laminate where one of the units is rotated through 90 degrees about the axis of incident light with respect to the other, thereby performing four times of pixel shift in the vertical and horizontal directions within one frame or one field.

On the other hand, Digital Micromirror Device [abbreviated as: DMD (trademark)], referred to as variable form mirror device for example used in the image display apparatus disclosed in Japanese patent application laid open No.8-190072, is known in addition to the above liquid crystal display device (LCD) as a display device in the image display apparatus. Such DMD has an array of several hundred or several thousand small inclined mirrors each representing one pixel. To achieve an inclination, each mirror is attached to one or more hinges placed on a supporting column, and a control circuit thereunder is disposed with an interval from others. An electrostatic force is then imparted by the control circuit, to thereby selectively incline each mirror. When it is applied to a display, image data is loaded to DMD and, in accordance with the data, light is selectively reflected or not reflected from each mirror to the image plane.

Further, in addition to polarization beam splitter (PBS), half-mirror (HM), etc., one as disclosed in Japanese patent application laid open No.9-189809 is known as a control device of optical beam. Specifically, in that publication, a disclosure is made with respect to a color image display apparatus using Holographic Optical Element (abbreviated as: HOE) where an incident light is diffracted/separated into the respective components such as R, G, B so as to obtain convergence at a desired portion by the diffraction/spectroscopic function of a transmitting type hologram.

In high-resolution image display apparatus using a known pixel shifting unit, transmitting type LCD is mostly used as the display device. An effective light transmitting region of pixels of the transmitting type LCD is limited for example by the wiring region that is provided between the pixels. Further, it is necessary to cut off light to avoid an erroneous operation which results from radiation of light on semiconductor switching device for driving LCD. One of the problems due to such reasons is that the aperture rate thereof cannot be increased.

To eliminate the above problems of image display apparatus using a conventional transmitting type display device, it is an object of the present invention to provide an image display apparatus in which a high resolution displaying is possible by using a reflecting type display device which the effective light transmitting region of pixels is not limited.

DISCLOSURE OF THE INVENTION

In accordance with the present invention, there is provided an image display apparatus for displaying an image to a viewer, including: illumination means for emitting an illuminating light; reflecting type display means capable of selectively controlling by each pixel a reflected light amount of the light emitted from the illumination means; pixel shifting means for shifting an optical axis of reflected light of each pixel reflected at the reflecting type display means so as to improve resolution of image observed by the viewer; and optical means for making it possible to display to the viewer an image constituted by light reflected from pixels selected to cause reflection at the reflecting type display means.

By thus using the reflecting type display means such as reflecting type LCD display device and the pixel shifting means of two-point or four-point pixel shift, the image display apparatus can be achieved as capable of high-resolution displaying.

If a polarizing beam splitter is then used as the optical means, the pixel shifting means is preferably placed at a subsequent stage of the polarization beam splitter. It is thereby possible to improve a utilization factor of light as compared to when a half-mirror is used.

Further, if a half-mirror is used as the optical means, the pixel shifting means is preferably placed between the half-mirror and the display means. It is thereby not necessary to use an expensive polarizing beam splitter as the optical means so that it can be formed at a lower cost.

Further, if a holographic optical element is used as the optical means, the pixel shifting means is preferably placed at a subsequent stage of the holographic optical element. Compacting and reduction in weight of the image display apparatus are thereby possible.

Further, the optical means and the pixel shifting means are preferably bonded to each other. By such monolithic construction, it is possible to reduce ghosts and flares due to reflected light between the pixel shifting unit and the optical means.

Further, the pixel shifting means is preferably placed as inclined with respect to the optical axis of the reflecting type display means. By such disposition, the reflected light from the pixel shifting means can be caused to return to the outside of the region of the reflecting type display means so as to reduce ghosts and flares due to re-reflection at the reflecting type display means.

Further, a digital micromirror device is preferably used as the reflecting type display means. By such construction, light from the illumination means can be caused to be directly incident on the digital micro-mirror device, making it unnecessary to use an light dividing device.

Further, a total area of all pixels that can be displayed by the reflecting type display means is preferably ¼ to ¾ of the total area of the reflecting type display means, or a mask for cutting off light is preferably placed on the upper surface of the reflecting type display means so that it is ¼ to ¾ of the total area of the reflecting type display means. By such construction, the resolution together with contrast can be remarkably improved though the efficiency in using light is somewhat lowered.

BRIEF DESCRIPTION OF THE DRAWING

FIGS. 16A and 16B show another example of construction of reflecting type LCD display device of the invention and the manner of pixel array in 2-point pixel-shifted displaying.

FIGS. 17A and 17B show another example of construction of reflecting type LCD display device of the invention and the manner of pixel array in 4-point pixel-shifted displaying.

DESCRIPTION OF THE PREFERRED EMBODIMENTS

Figure 1:
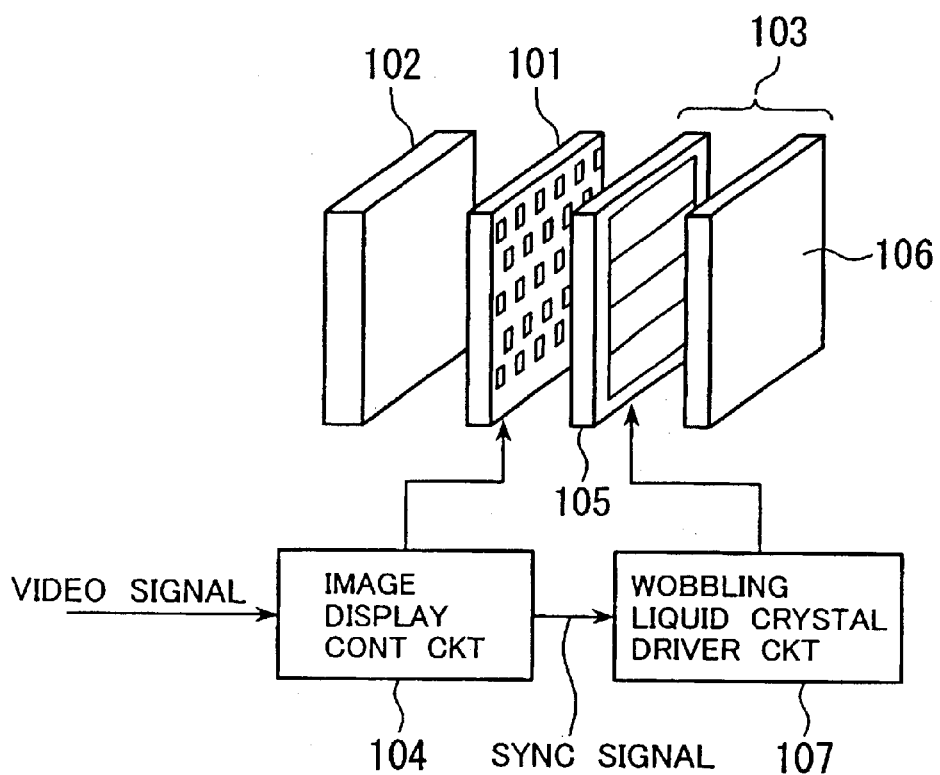
FIG. 1 schematically shows an image display apparatus using a conventional wobbling device (pixel shifting unit).
Figure 2A:
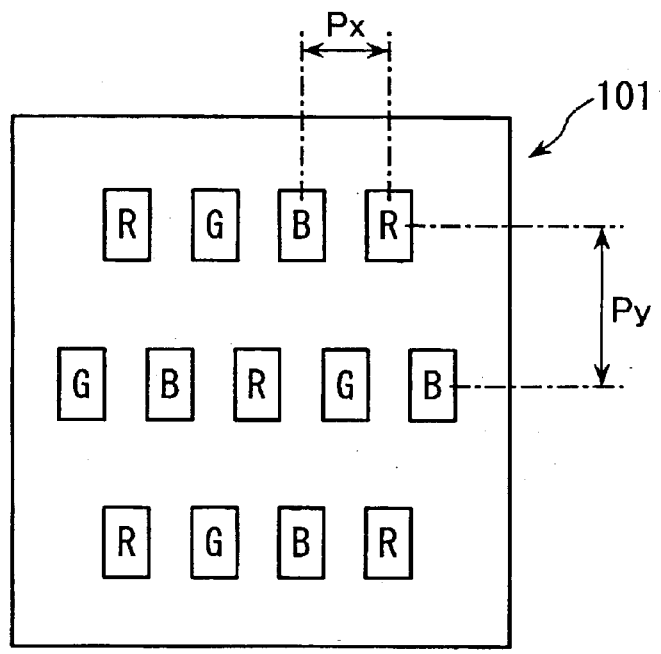
FIGS. 2A and 2B show the manner of pixel array by the wobbling operation of a color liquid crystal display device.
Figure 2B:
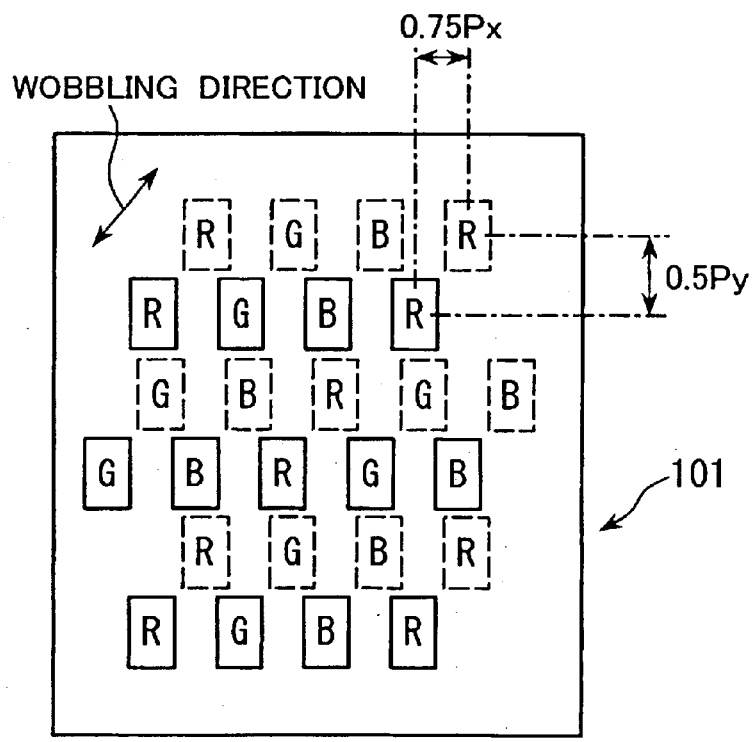
Figure 3:
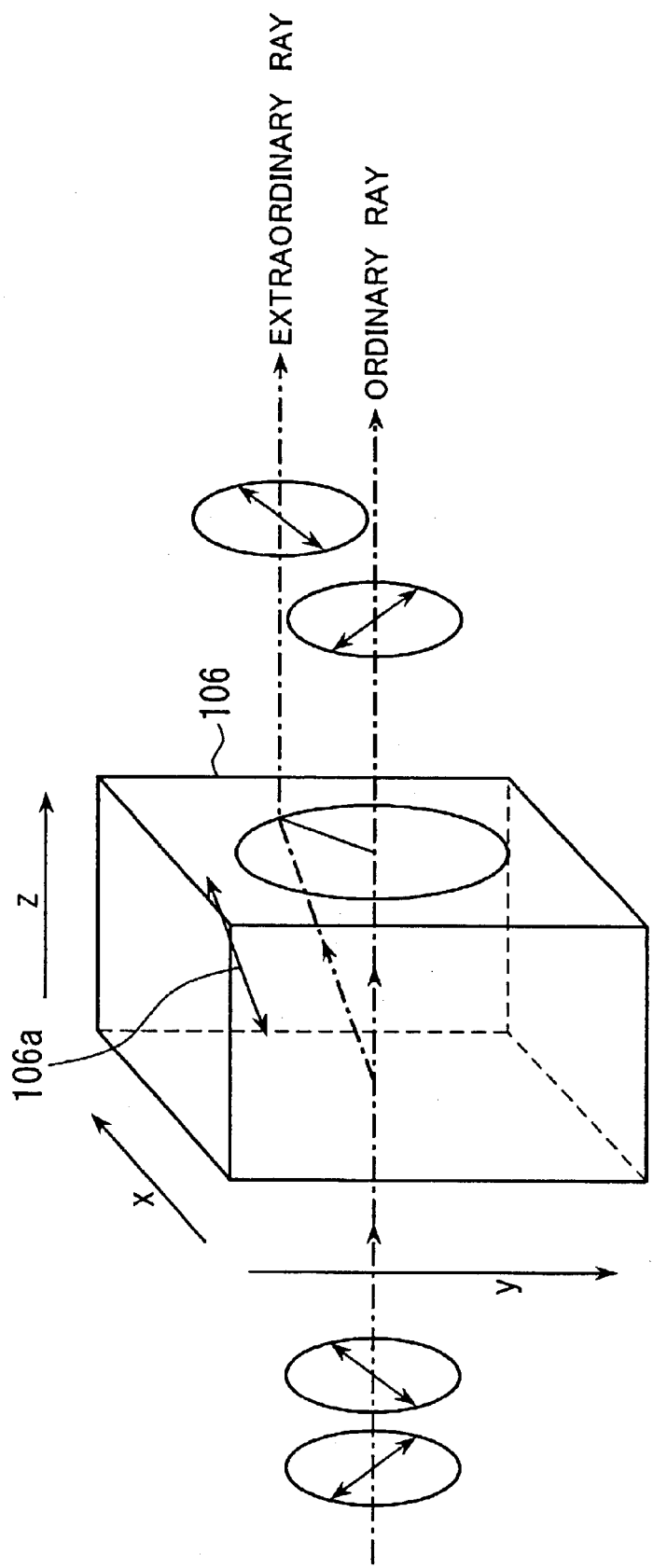
FIG. 3 illustrates the operation of a birefringence plate of the wobbling device.
Figure 4:
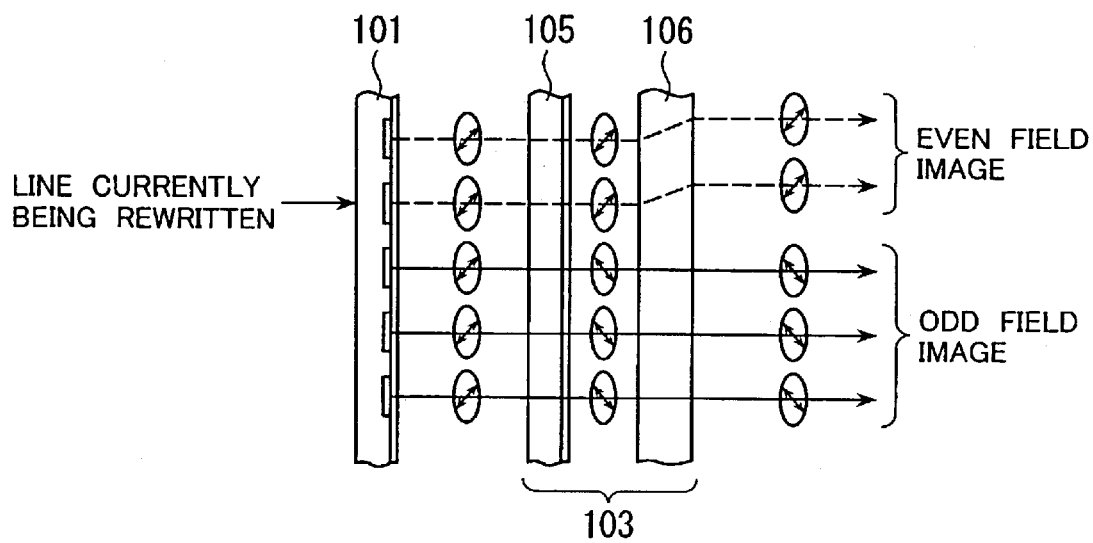
FIG. 4 shows the manner of pixel shifting in an odd filed and even field by the wobbling device of the image display apparatus shown in FIG. 1.
Figure 5:
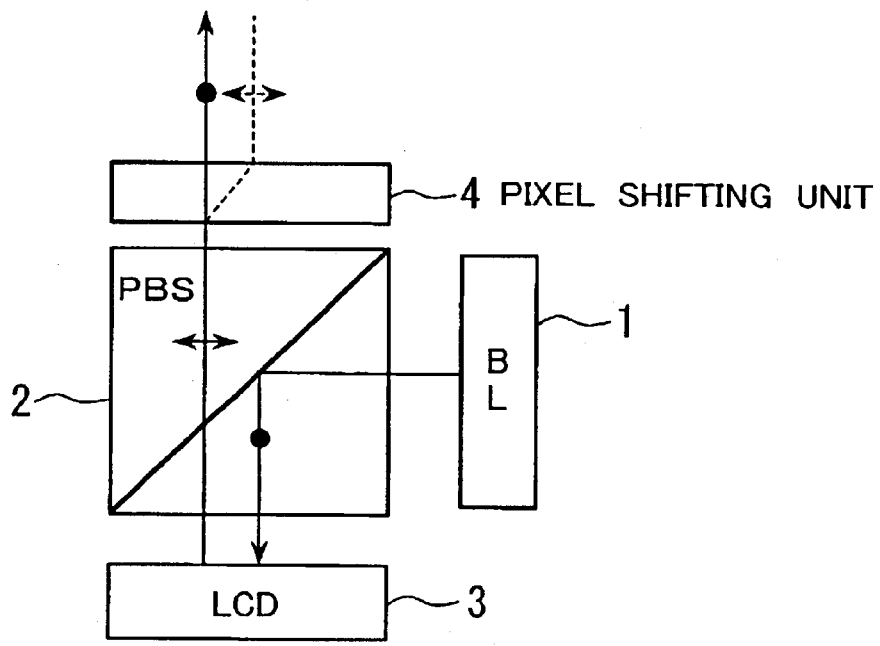
FIG. 5 schematically shows the construction of a first embodiment of the image display apparatus according to the invention.

A description will now be given by way of the attached drawings to explain the invention in detail. FIG. 5 is a block diagram showing a first embodiment of the image display apparatus according to the invention. Referring to FIG. 5, numeral 1 denotes a back light for emitting light to be used displaying, and numeral 2 denotes a polarization beam splitter (PBS) for splitting light (natural light) emitted from the back light 1 into two parts so as to project one thereof toward a reflective LCD display device 3 as a light polarized in a specified direction. The reflective LCD display device 3 has a reflecting film formed on the reverse surface of LCD so that the incident light is reflected at the reflecting film to emit a prescribed displaying light in a polarized manner. Numeral 4 denotes a pixel shifting unit which allows the polarized displaying light from the reflective LCD display device 3 transmitted through the PBS 2 to be incident thereupon so as to perform 2-point or 4-point pixel shifting.

In thus constructed image display apparatus, the light emitted from the back light 1 is split into ½ with respect to each polarization component at the polarization beam splitter 2 and is incident on the reflective LCD 3. From the reflective LCD display device 3, the reflected, polarized displaying light passes through the polarization beam splitter 2 again and enters the pixel shifting unit 4 where 2-point or 4-point pixel shifting is performed to obtain a high-resolution display. It should be noted that, in FIG. 5, arrows and black dots in the polarization beam splitter 2 indicate the direction of polarization so that lights polarized in specified directions are caused to be incident respectively on the reflective LCD display device 3 and pixel shifting unit 4. Further, the dotted line indicates an optical axis when the pixel shifting is performed at the pixel shifting unit 4.

In this embodiment, the pixel shifting unit 4, because of its function, cannot be placed between the back light 1 and polarization beam splitter 2 or between the polarization beam splitter 2 and reflective LCD display device 3. The position of its placement is limited to the emitting side of the polarization beam splitter 2. Further, the use of the polarization beam splitter as a light dividing device results in an advantage that the utilization rate of light is high, since the light emitted from the back light 1 is merely reduced to ½.

Figure 6:
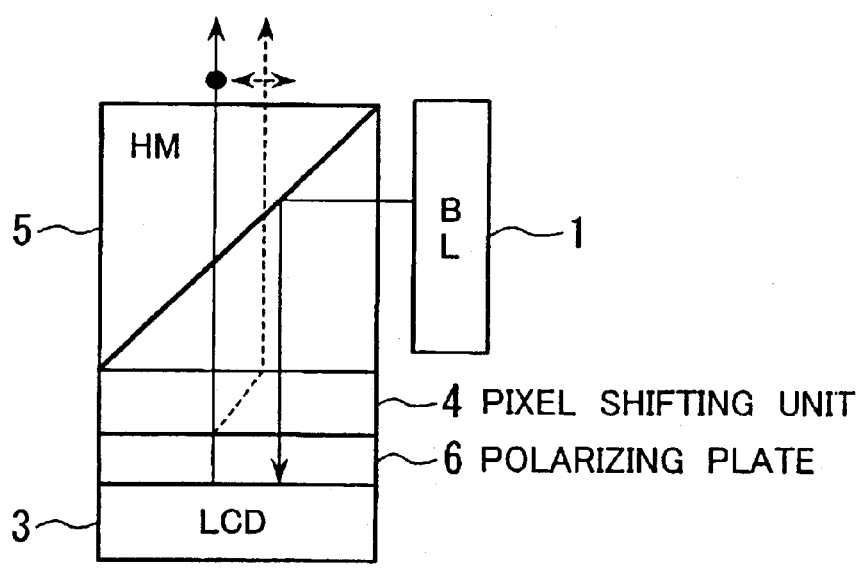
FIG. 6 schematically shows the construction of a second embodiment of the image display apparatus according to the invention.

A second embodiment of the invention will now be described by way of the block diagram of FIG. 6. In this embodiment, instead of a polarization beam splitter (PBS), a half-mirror (HM) is used as the light dividing device. Like components as in the first embodiment shown in FIG. 5 are denoted by like reference numerals. In particular, when a half-mirror 5 is used as the light dividing device as shown in FIG. 6, the pixel shifting unit 4 is placed between the half-mirror 5 and the reflective LCD display device 3 with an intervening polarizing plate 6 placed toward the reflective LCD display device 3. The half-mirror 5, pixel shifting unit 4, polarizing plate 6, reflective LCD display device 3 are integrated as bonded to each other. While the pixel shifting unit 4 is capable of being placed at a subsequent stage of the half-mirror similarly to the first embodiment, it is placed at the above described location because the size of the unit can be reduced. Further, the bonding of the respective devices to each other reduces the reflected light among the devices and reduces ghosts and flares.

In thus constructed image display apparatus, the light (natural light) coming from the back light 1 is divided into ½ at the half-mirror 5 and enters the pixel shifting unit 4. Since the incident light at this time is without polarization, it is not affected by the pixel shifting unit 4. The light coming out of the pixel shifting unit 4 is caused to become a polarized light in certain direction by the polarizing plate 6 and is incident on the reflective LCD display device 3. The polarized displaying light reflected from the reflective LCD display device 3 is caused to become a polarized light in a specified direction again by the polarizing plate 6 and is incident on the pixel shifting unit 4, where 2-point or 4-point pixel shift is performed so that a high-resolution display can be obtained after transmitted through the half-mirror 5.

In this embodiment, the light from the back light 1 is reduced to ¼, since the light is transmitted twice through the half-mirror 5. It is however not necessary to use an expensive polarization beam splitter as the light dividing device and a relatively inexpensive construction becomes possible. Further, since the pixel shifting unit 4 is placed integrally with the polarizing plate 6 between the half-mirror 5 serving as the light dividing device and the reflective LCD display device 3, its size can be almost as small as the reflective LCD display device 3. Furthermore, because of the integrated construction, ghosts and flares due to reflecting light at the pixel shifting unit 4 can be reduced.

Figure 7:
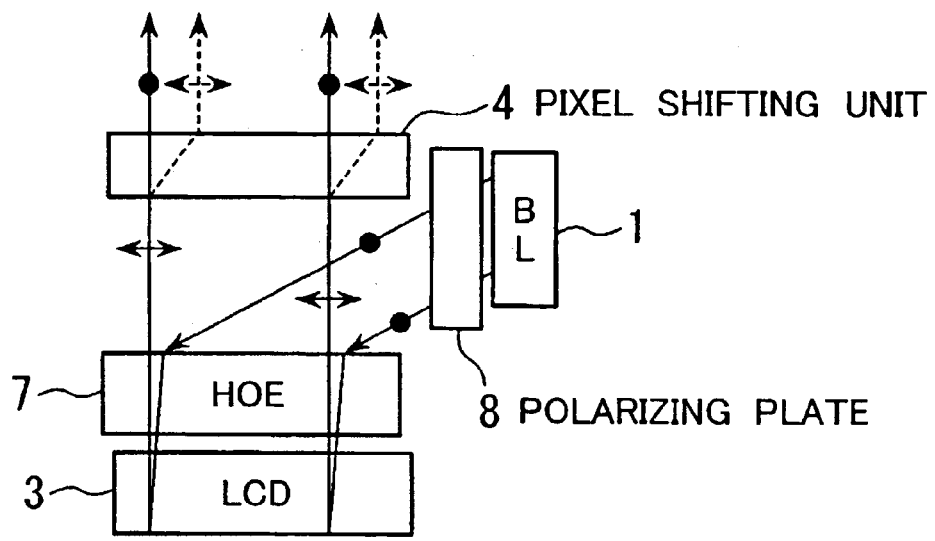
FIG. 7 schematically shows the construction of a third embodiment of the image display apparatus according to the invention.

A third embodiment of the invention will now be described by way of the block diagram of FIG. 7. In this embodiment, a holographic optical element (HOE) is used as the light dividing device. Like components as in the first embodiment shown in FIG. 5 are denoted by like reference numerals. In particular, this embodiment uses a holographic optical element 7 instead of the polarization beam splitter 2 in the first embodiment shown in FIG. 5. A polarized light obtained by transmitting natural light from the back light 1 through the polarizing plate 8 is caused to enter the holographic optical element 7 so that the polarized light diffracted/separated at the holographic optical element 7 is incident on the reflecting LCD display device 3.

The reflected, polarized displaying light emitted from the reflective LCD display device 3 is then transmitted through the holographic optical element 7 again and caused to enter the pixel shifting unit 4, where 2-point or 4-point pixel shift is performed to similarly obtain a high-resolution display.

In this embodiment, instead of a polarization beam splitter which is expensive and has a relatively large size, a thin and small-sized holographic optical element 7 is used as the light dividing device. For this reason, the image display apparatus can be achieved as compact in size and light in weight.

Figure 8:
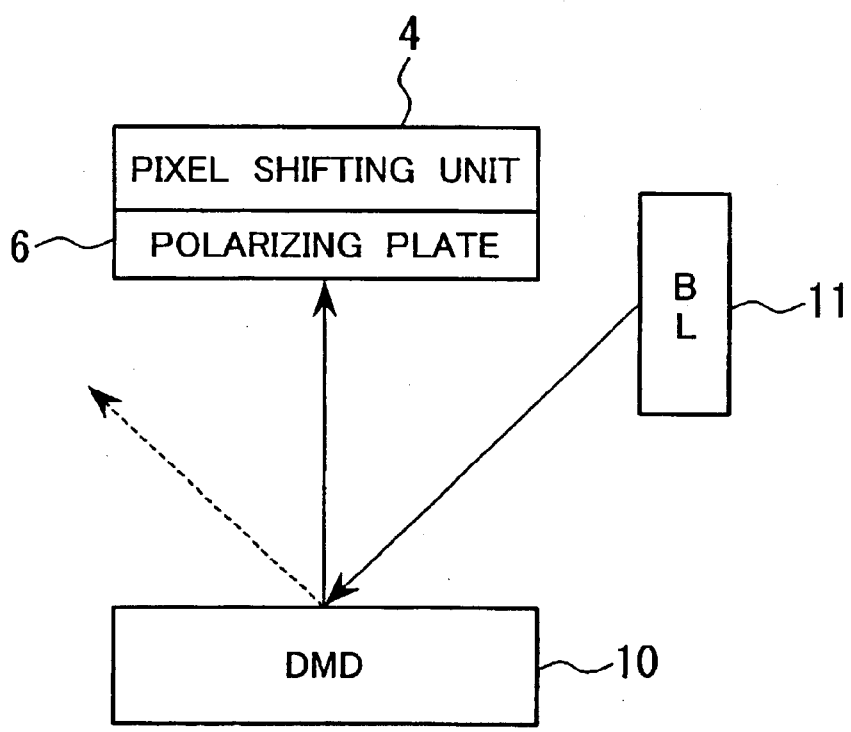
FIG. 8 schematically shows the construction of a fourth embodiment of the image display apparatus according to the invention.

A fourth embodiment of the invention will now be described by way of the block diagram of FIG. 8. In this embodiment, Digital Micromirror Device (DMD) is used as a reflecting type display device. In particular, natural light from the back light 1 is projected onto a digital micromirror device 10. A reflected light of micromirror of the digital micromirror device 10 controlled by a predetermined signal is caused to enter the pixel shifting unit 4 as a light polarized in certain direction through the polarizing plate 6. In the pixel shifting unit 4, 2-point or 4-point pixel shift is performed so that a high-resolution display can be obtained.

By thus using a digital micromirror device as the reflecting display device instead of a reflective LCD display device, the light coming out of the back light 1 can be directly incident on the digital micromirror device 10 so that it is not necessary to use a light dividing device.

Figure 9:
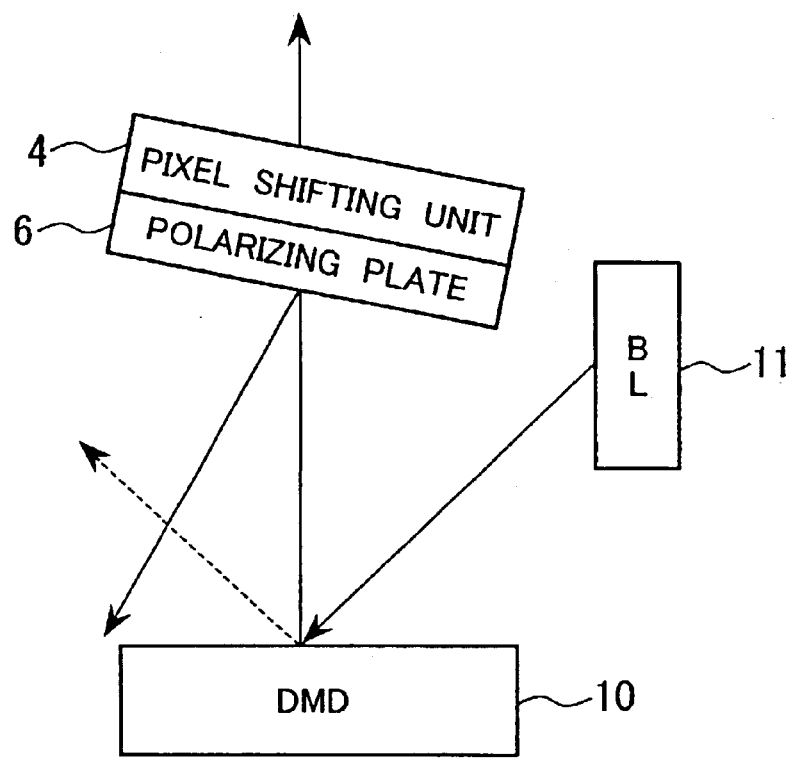
FIG. 9 schematically shows the construction of a fifth embodiment of the image display apparatus according to the invention.

A fifth embodiment of the invention will now be described by way of the block diagram of FIG. 9. When the pixel shifting unit 4 and polarizing plate 6 are placed in parallel to the digital micromirror device 10 as shown in the fourth embodiment of FIG. 8, it is possible that ghosts and flares occur due to lights reflected at the pixel shifting unit 4 and polarizing plate 6. To avoid such problem, the pixel shifting unit 4 together with the polarizing plate 6 in this embodiment is inclined by several degrees as shown in FIG. 9 with respect to the digital micromirror device 10.

By thus inclining the pixel shifting unit 4 and polarizing plate 6, the light reflected at the pixel shifting unit 4 and polarizing plate 6 can be caused to return to outside the region of the digital micromirror device 10 so as to prevent ghosts and flares resulting from re-reflection by the digital micromirror device 10.

Figure 10:
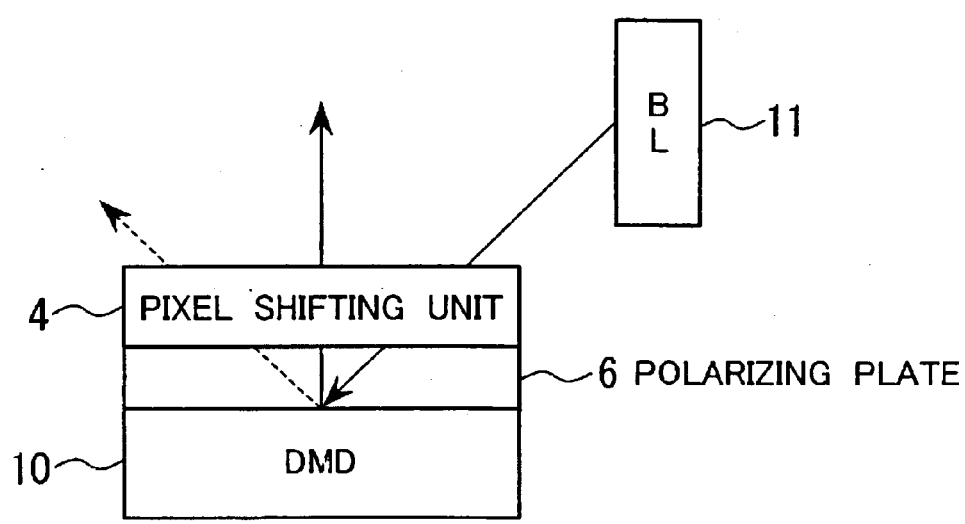
FIG. 10 schematically shows the construction of a sixth embodiment of the image display apparatus according to the invention.

A sixth embodiment of the invention will now be described by way of the block diagram of FIG. 10. Like the fifth embodiment shown in FIG. 9, the present embodiment aims at reducing ghosts and flares due to the light reflected from the pixel shifting unit 4 and polarizing plate 6. To this end, the pixel shifting unit 4 and polarizing plate 6 and digital micromirror device 10 in this embodiment are integrally formed by means of bonding.

By such construction, the reflecting light at the pixel shifting unit 4 and at the polarizing plate 6 can be eliminated to reduce ghosts and flares.

Figure 11:
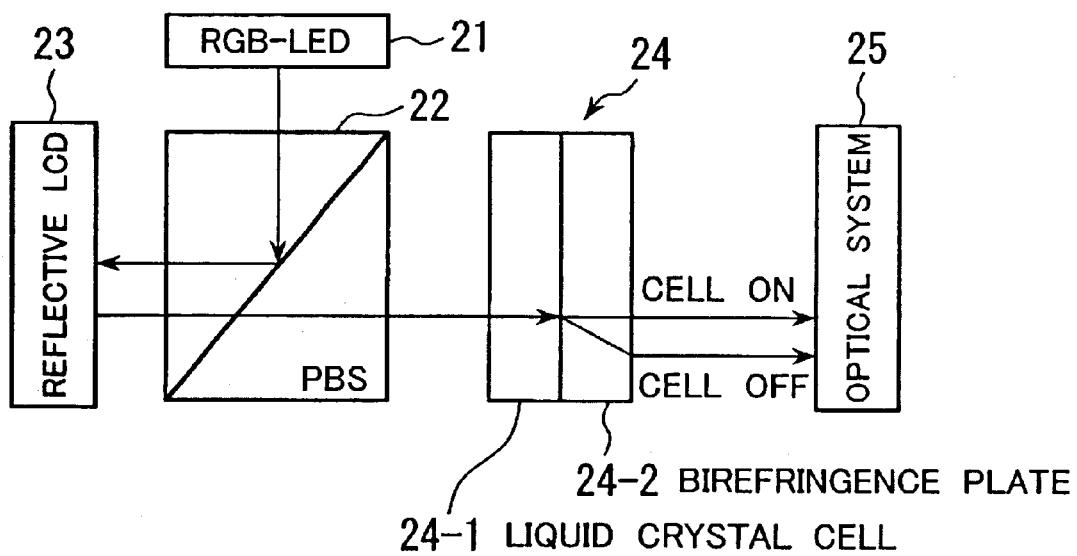
FIG. 11 schematically shows the optical construction of the first embodiment shown in FIG. 5.

Schematically shown in FIG. 11 is a typical example of optical construction corresponding to the image display apparatus of the first embodiment shown in FIG. 5. FIG. 11 includes: a back light 21 consisting of RGB-LED; a polarization beam splitter (BPS) 22; a reflective LCD display device 23; a pixel shifting unit 24 which is a 2-point pixel shifting unit consisting of a liquid crystal cell 24-1 and a birefringence plate 24-2; and an optical system 25.

Figure 12:
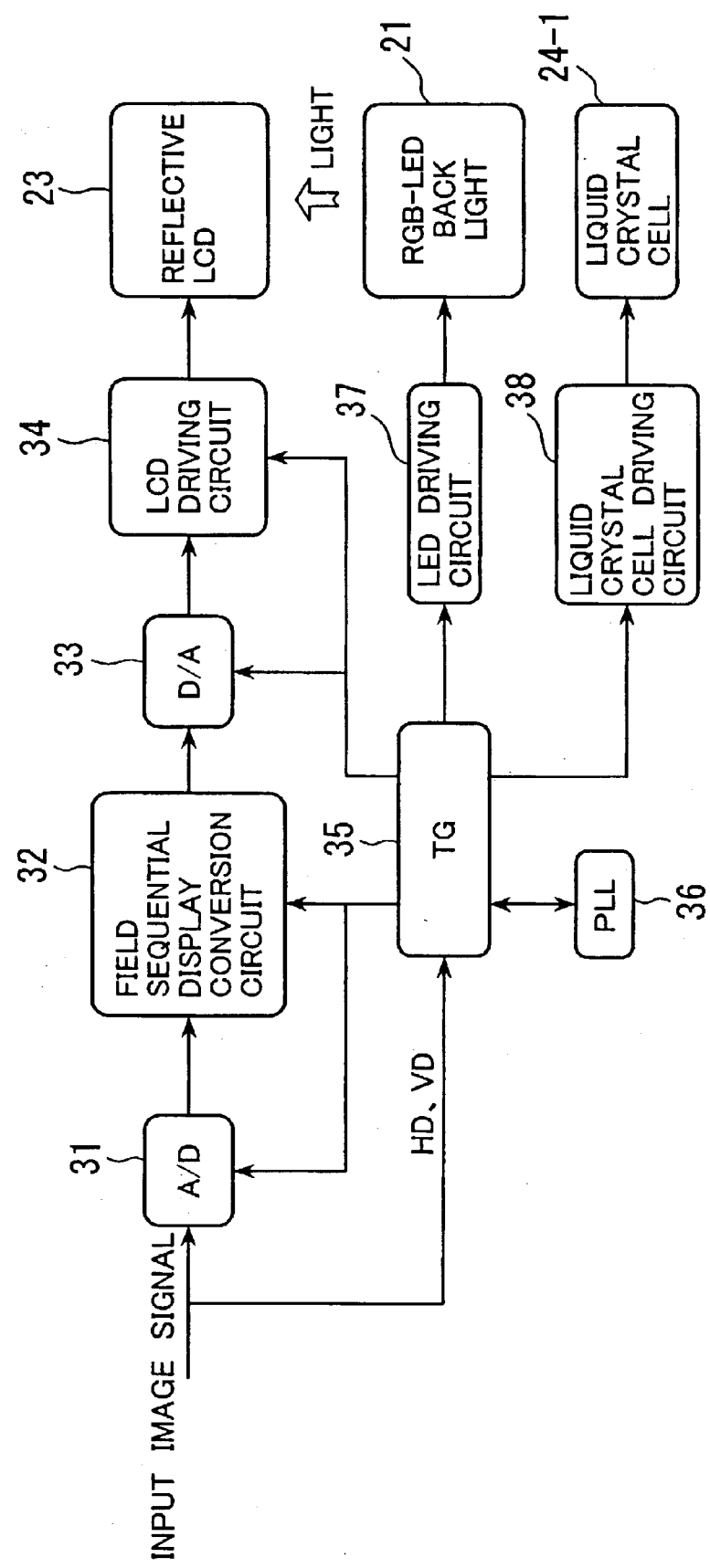
FIG. 12 is a block diagram showing an electric circuit construction for driving the respective portions of the image display apparatus shown in FIG. 11.

Of the image display apparatus having such construction, an electrical block circuit diagram for generating driving signals, etc. to be supplied to the respective sections is shown in FIG. 12. Referring to FIG. 12: numeral 31 denotes A/D conversion circuit for effecting A/D conversion of input image signal; 32, a field sequential display conversion circuit for tripling the rate of the A/D-converted image signal and separating it into R, G, B signals to output R, G, B field sequential signals; 33, D/A conversion circuit for effecting D/A conversion of R, G, B field sequential signals from the field sequential display conversion circuit 32; and 34, LCD driving circuit to which the D/A converted R, G, B field sequential signals are inputted to generate driving signal for driving the reflective LCD display device 23.

Further: 35, a timing generation circuit to which a synchronizing signal of the input image signal is inputted to generate timing signals to the respective sections; 36, PLL circuit for controlling the timing generation circuit 35; 37, LED driving circuit to which a timing signal from the timing generation circuit 35 is inputted to generate a driving signal for driving RGB-LED back light 21; 38, a liquid crystal cell driving circuit to which a timing signal from the timing signal generation circuit 35 is inputted to generate a driving signal for controlling ON/OFF of the liquid crystal cell 24-1 of the pixel shifting unit 24.

Figure 13A:
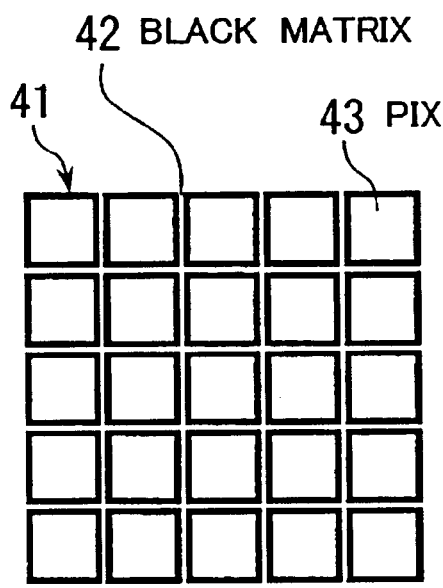
FIGS. 13A to 13C show the manner of pixel shifting of LCD pixel array in the case where a pixel-shifted displaying is performed by combining an ordinary reflecting type LCD display device and a two-point pixel shifting unit.
Figure 13B:
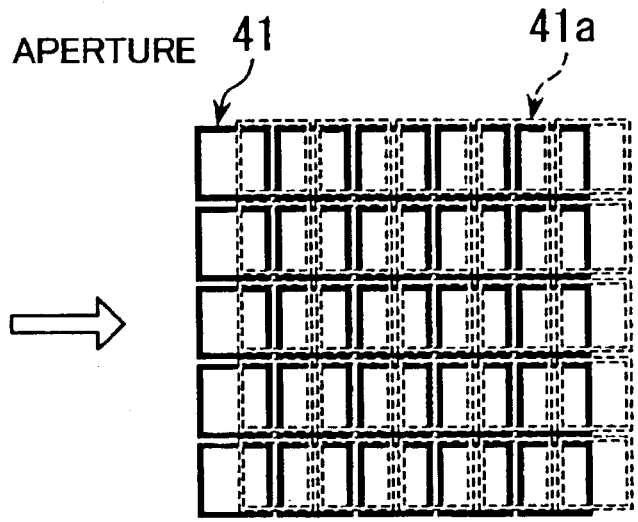
Figure 13C:
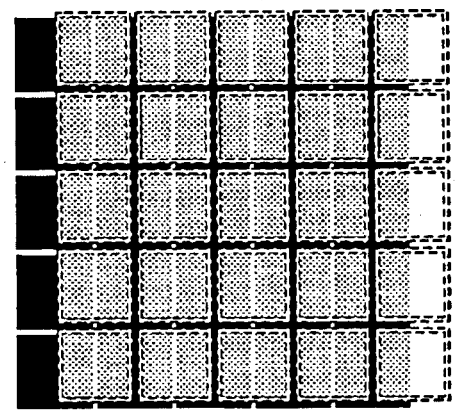

An actual construction of the reflective LCD display device will now be described. Generally, a reflective LCD display device has an LCD pixel array 41 having a large aperture rate as shown in FIG. 13A, where black matrix portion 42 is narrow and pixel aperture portion 43 is wide. When the reflective LCD display device having such pixel array is used in combination with a pixel shifting unit to perform pixel-shifted displaying, a pixel-shifted pixel array 41a as represented by the manner indicated by dotted lines results in an array mode as shown in FIG. 13B where it is overlapped each other by the LCD pixel array 41. Accordingly, if for example the original pixels that are not pixel-shifted are all black and the pixel-shifted pixels are all white, the pixel-shifted displaying causes all of them to be displayed in gray as shown in FIG. 13C where the contrast in the pixel-shifted display image is lowered.

Figure 14A:
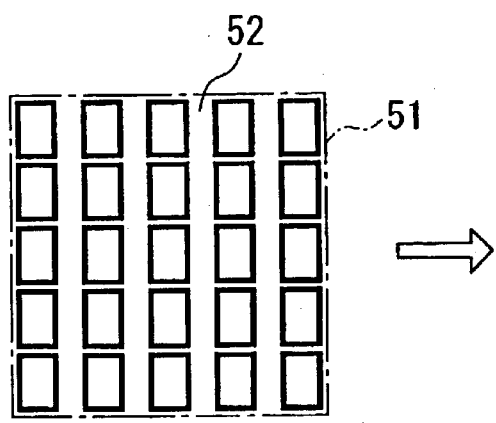
FIGS. 14A to 14C are example of construction of reflecting type LCD display device and the manner of pixel array in displaying of 2-point pixel shifting in the invention.

In the present invention, therefore, when the reflective LCD display device is used in combination with 2-point pixel shifting unit, a non-displaying region 52 having its area ½ of the total area of a displaying section (pixel section) 51 is provided as shown in FIG. 14A. The non-displaying region 52 is formed by a black matrix.

Figure 14B:
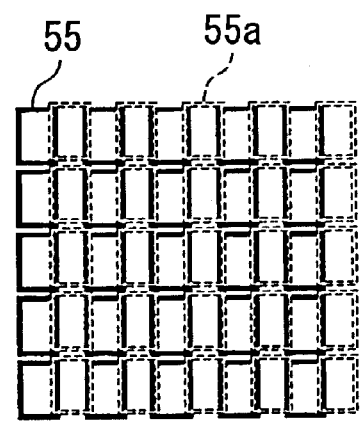
Figure 14C:
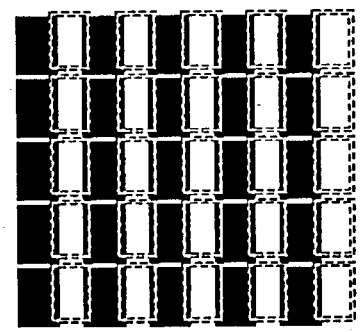

When two-point pixel-shifted displaying is performed in the reflective LCD display device having such construction as combined with a pixel shifting unit, the reciprocally overlapped portion hardly occurs as shown in FIG. 14B. In FIG. 14B, numeral 55 denotes LCD-pixel array and 55a denotes the pixel-shifted pixel array. Supposing thus for example that the original pixels without pixel shifting are all black and the pixel-shifted pixels are all white, the black pixels and white pixels are displayed as clearly distinguished from each other as shown in FIG. 14C. Accordingly, the resolution at the same time of contrast can be remarkably improved by forming the non-displaying region 52, though the efficiency in using light (aperture rate) is somewhat lowered.

Further, there is an advantage even when the aperture portion is greater than ½ of the total area. For example, a total of all pixel areas that can be displayed is equal to or less than ¾ of the total area of the reflective LCD display device, it becomes possible, though contrast and resolution are somewhat lowered, to display a brighter image due to the improved efficiency in using light (aperture rate). Practically, therefore, the total of all pixel area that can be displayed is preferably equal to or less than ¾ of the total area.

Figure 15A:
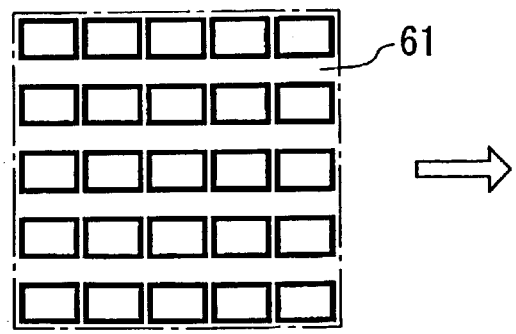
FIGS. 15A and 15B show another example of construction of reflecting type LCD display device of the invention and the manner of pixel array in 2-point pixel-shifted displaying.
Figure 15B:
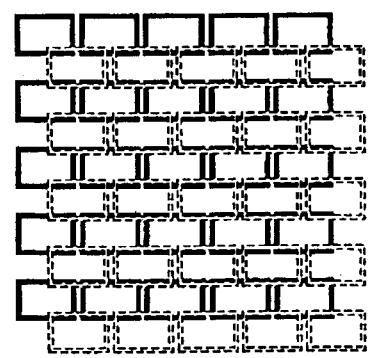

When, as shown in FIG. 14A, the non-displaying region is provided as a vertically elongated rectangular shape, the resolution in horizontal direction is improved so that it becomes suitable to the case of stressing the image displayed in the horizontal direction. Further, when non-displaying region 61 is provided as a horizontally elongated rectangular shape as shown in FIG. 15A and FIG. 15B, the resolution in the vertical direction is improved so that it becomes suitable to the case of stressing the image displayed in the vertical direction. Furthermore, as shown in FIG. 16A and FIG. 16B, it is also possible to form both displaying pixels 71 and non-displaying region 72 into rhombuses. In this case, the horizontal and vertical resolutions can be improved to the same level as each other.

While, in the above reflective LCD display device, the non-displaying region has been formed as that corresponding to the case where it is used in combination with a 2-point pixel shifting unit, one having an array of pixels 81 and non-displaying region 82 as shown in FIG. 17A is used when it is used in combination with a 4-point pixel shifting unit. When 4-point pixel-shifted display is performed by using a 4-point pixel shifting unit for the reflective LCD display device having such construction, a pixel pattern as shown in FIG. 17B is obtained to further improve the resolution. In this case, the total of all pixel areas that can be displayed becomes ¼ of the total area of the displaying section of the display device and the total area of the non-displaying region becomes ¾.

Figure 18A:
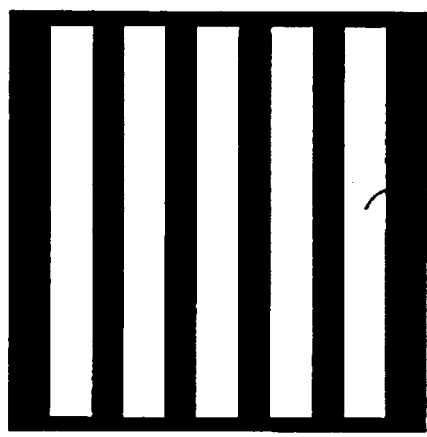
FIGS. 18A to 18D show construction of reflecting type LCD display device having a light-blocking mask according to the invention.
Figure 18B:
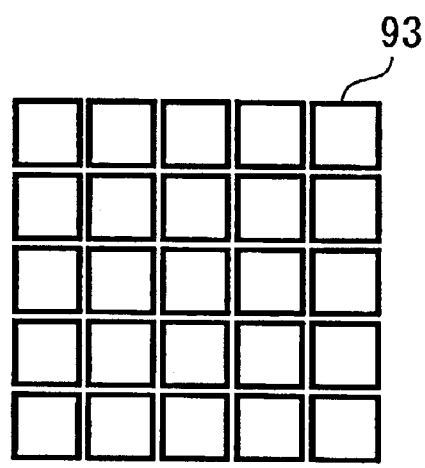
Figure 18C:
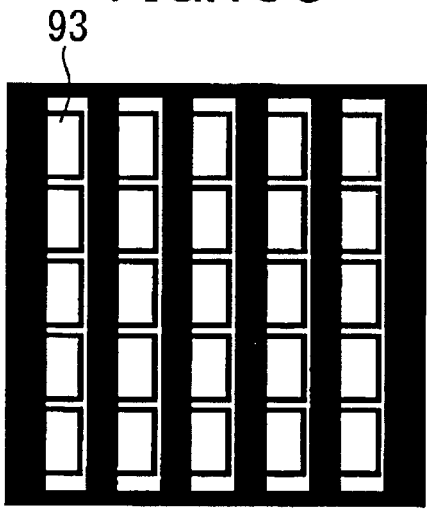

Further, the above described reflective LCD display device has been shown as that in which the resolution is improved by providing a non-displaying region on the LCD display device itself. Instead of providing a non-displaying region on the LCD display device itself as described, it is also possible to separately form a shielding mask 91 as shown in FIG. 18A having a large number of rectangular openings 92 at the same pitch as the pitch of displaying pixels of the LCD display device. This shielding mask is placed in the manner as shown in FIG. 18C over the upper surface of reflective LCD display device 93 which has ordinarily large openings as shown in FIG. 18B.

Figure 18D:
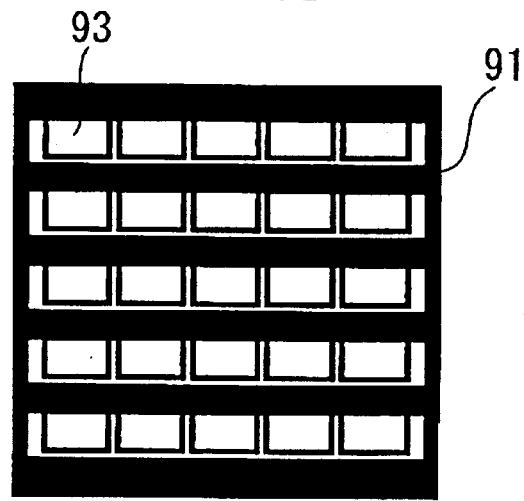

In such construction, the resolution in the horizontal direction can be improved by using 2-point pixel shifting unit similarly to that in which the non-displaying region shown in FIG. 14A is provided. Further, an LCD display device with an improved vertical resolution can be obtained by turning sideways the shielding mask 91 shown in FIG. 18A and placing it on the upper surface of the reflective LCD display device 93 as shown in FIG. 18D.

EFFECT OF THE INVENTION

As the above, since the image display apparatus according to the invention uses a reflecting type display means such as the reflecting type LCD display device and a pixel shifting means of 2-point or 4-point pixel shift, the image display apparatus can be achieved as having a large aperture rate and capable of high-resolution display.

What is claimed is:

1. An image display apparatus for displaying an image to a viewer, comprising:

illumination means for emitting an illuminating light;

reflecting type display means capable of selectively controlling by each pixel a reflected light amount of the light emitted from the illumination means;

pixel shifting means for shifting an optical axis of reflected light of each pixel reflected at said reflecting type display means so as to improve resolution of image observed by the viewer; and optical means for making it possible to display to the viewer an image constituted by light reflected from pixels selected to cause reflection at said reflecting type display means.

2. The image display apparatus according to claim 1, wherein said optical means comprises a polarization beam splitter and said pixel shifting means is placed at a subsequent stage of said polarization beam splitter.

3. The image display apparatus according to claim 1, wherein said optical means comprises a half-mirror and said pixel shifting means is placed between said half-mirror and said reflecting type display means.

4. The image display apparatus according to claim 1, wherein said optical means comprises a polarizing plate and a holographic optical element (HOE) and said pixel shifting means is placed at a subsequent stage of the holographic optical element.

5. The image display apparatus according to claim 1, wherein said optical means and said pixel shifting means are bonded to each other so as to reduce ghosts and flares within image to be displayed to the viewer.

6. The image display apparatus according to claim 1, wherein said pixel shifting means is placed in a manner inclined with respect to the optical axis of said reflecting type display means so as to reduce ghosts and flares within image to be displayed to the viewer.

7. The image display apparatus according to claim 1, wherein said reflecting type display means comprises a digital micromirror device (DMD) and wherein a polarizing plate is placed over a front side of said pixel shifting means.

8. The image display apparatus according to claim 1, wherein said reflecting type display means is so constructed that total area of all pixels that can be displayed thereat is ¼ to ¾ of the total area of the reflecting type display means.

9. The image display apparatus according to claim 1, wherein a mask for cutting off light is placed on an upper surface of said reflecting display means so that total area of all pixels that can be displayed by said reflecting type display means is ¼ to ¾ of the total area of the reflecting type display means.

* * * * *